United States Patent Office 3,699,062
Patented Oct. 17, 1972

3,699,062
STABILIZED OXYMETHYLENE POLYMERS
Leon Starr, Scotch Plains, N.J., and David Jon Runyon, Hoffman Estates, Ill., assignors to Celanese Corporation, New York, N.Y.
No Drawing. Continuation-in-part of application Ser. No. 878,916, Nov. 21, 1969. This application July 7, 1971, Ser. No. 160,557
Int. Cl. C08g 51/54
U.S. Cl. 260—18 N                                  12 Claims

ABSTRACT OF THE DISCLOSURE

Pigmented oxymethylene polymers are stabilized by a novel stabilizer which comprises an oxymethylene polymer antioxidant, a metal salt of non-nitrogenous organic acids and alcohols having from 2 to about 30 carbon atoms and a modified fatty acid polyamide. This unique stabilizer need only be used in very limited quantities to impart an improvement in thermal stability. A preferred composition comprises (A) a phenolic antioxidant, (B) an alkaline earth ricinoleate and (C) an anhydride modified fatty acid polyamide.

BACKGROUND OF THE INVENTION

This application is a continuation-in-part of copending application Ser. No. 878,916 filed on Nov. 21, 1969, now abandoned.

(1) Field of the invention.—This invention relates to oxymethylene polymers. More particularly it relates to stabilization of moldable pigmented oxymethylene polymerised by a novel stabilizing system.

The term oxymethylene polymer as used herein is meant to include oxymethylene homopolymers and diethers and diesters. Also included are oxymethylene copolymers, which includes oxymethylene polymers having at least 60 percent recurring oxymethylene units and at least one other unit derived from a monomer copolymerizable with the source of the oxymethylene units. Among the copolymers which are utilized in accordance with this aspect of the invention are those having a structure comprising recurring units having the formula:

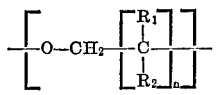

wherein each $R_1$ and $R_2$ is selected from the group consisting of hydrogen, lower alkyl of from 1 to 4 carbon atoms, and halogen substituted lower alkyl radicals of from 1 to 4 carbon atoms and wherein $n$ is an integer from zero to 5 and wherein $n$ is zero in from 60 to 99.6 percent of the recurring units.

A preferred class of copolymers are those having a structure comprising recurring units having the formula $(-O-CH_2-(CH_2O)_n-)$ wherein $n$ is an integer from zero to 2 and wherein $n$ is zero in from 60 to 99.6 percent of the recurring units. These copolymers are prepared by copolymerizing trioxane with a cyclic ether having the structure

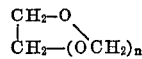

where $n$ is an integer from zero to two.

Among the specific cyclic ethers which may be used are ethylene oxide, 1,3 - dioxolane, 1,3,5-trioxepane, 1,3-dioxane, trimethylene oxide, pentamethylene oxide, 1,2-propylene oxide, 1,2 - butylene oxide, neopentyl formal, pentaerythritol diformal, paraldehyde, tetrahydrofuran, and butadiene monoxide.

(2) Description of the prior art.—Oxymethylene polymers having recurring —$CH_2O$— units have been known for many years. They may be prepared for example, by the polymerization of anhydrous formaldehyde or by the polymerization of trioxane, which is a cyclic trimer of formaldehyde, and will vary in physical properties such as thermal stability, molecular weight, molding characteristics, color and the like depending, in part, upon their method of preparation, on the catalytic polymerization technique employed and upon the various types of comonomers which may be incorporated into the polymer.

While these high molecular weight oxymethylene polymers are relatively thermally stable, various treatments have been proposed to increase the polymers utility by increasing its thermal stability. Among these are end capping of hemiformal groups of polyoxymethylene homopolymers and hydrolysis to remove unstable groups of oxymethylene in copolymers containing interspaced stable units, such as ethoxy groups.

Even beyond these treatments it has been found necessary to incorporate various stabilizers, antioxidants and chain-scission inhibitors into the polymers. For example United States Patent 3,484,399 discloses a non-nitrogenous oxymethylene polymer stabilizer system comprising an alkylene bisphenyl antioxidant and a metal salt of non-nitrogenous organic acids and alcohols having from 2 to about 30 carbon atoms and United States Patent 3,377,313 discloses a nitrogenous oxymethylene polymer stabilizer system comprising an alkylene bisphenol antioxidant and a polyamide. These additives have been found very effective in lowering the thermal degradation rate of the polymer. However, when these additives are admixed into a pigmented oxymethylene polymer composition the thermal degradation rate of the pigmented oxymethylene polymer increases markedly over the thermal degradation rate of the unpigmented oxymethylene polymer composition containing such additives.

To overcome this thermal instability of pigmented oxymethylene polymer compositions, United States Patent 3,377,313 teaches that an additional amount of polyamide stabilizer or an additional amount of another formic acid acceptor should be added to the originally stabilized oxymethylene polymer when pigment is incorporated therein.

The present invention is based on the discovery that a ternary stabilizer system for pigmented oxymethylene polymer compositions comprising a metal salt of non-nitrogenous organic acids and alcohols having from 2 to about 30 carbon atoms, a modified fatty acid polyamide and an alkylene bisphenol antioxidant yields improved thermally stabilized pigmented oxymethylene polymer compositions wherein the thermal stability of the pigmented composition is better than that which can be achieved, at an equivalent amount of stabilizer loading, by the use of any one of the ternary components alone or mixtures of only two or the ternary stabilizer components.

SUMMARY OF THE INVENTION

We have found that a particular stabilizing system comprising an oxymethylene polymer antioxidant, a metal salt of non-nitrogenous organic acids and alcohols having from 2 to about 30 carbon atoms and a modified fatty acid polyamide when incorporated into a pigmented oxymethylene polymer provide a composition of synergistically improved thermal stability. Preferably, the pigmented oxymethylene polymer composition comprises a pigmented oxymethylene polymer having admixed therein a minor proportion each of (A) an alkylene bisphenol antioxidant, (B) an alkaline earth ricinoleate such as calcium ricinoleate, and (C) a modified fatty acid polyamide.

The stabilizer system of our invention may be used in conjunction with a pigmented oxymethylene polymer composition, wherein the pigment material is black, white, red, blue or green or any other pigment well known in the art, or any tint, shade or combination thereof. In addition, the stabilizer system of our invention may be used in conjunction with a pigmented oxymethylene polymer composition wherein the pigment material is carbon black.

Component (A) of the stabilizer system is an oxymethylene polymer antioxidant. Suitable antioxidants are alkylene bisphenols, thiobisphenols, polyhydroxyphenols, and amines.

Preferably the antioxidant is an alkylene bisphenol. A suitable class of alkylene bisphenols include compounds having from 1 to 4 carbon atoms in the alkylene group and having up to 2 alkyl substituents on each benzene ring, each alkyl substituent having from 1 to 4 carbon atoms. The preferred alkylene bisphenols are: 1,2 - bis(2 - hydroxy - 4 - methyl - 6 - t-butyl-phenyl) ethane; bis (2 - hydroxy - 4 - methyl - 6 - t-butyl-phenyl) methane; 1,1 - bis(3 - methyl - 4 - hydroxy-6-t-butyl-phenyl) ethane and 1,1 - bis(3 - methyl - 4 - hydroxy-6-t-butyl-phenyl)-n-butane and bis(2 - hydroxy - 3-t-butyl - 5 - methyl-phenyl) methane. Suitable phenolic stabilizers other than alkylene bisphenols include 2,6-ditertiary-butyl-4-methyl phenol, p-octyl phenol and p-phenyl phenol.

Component (B) is one or more metal salts of (A) a non-nitrogenous organic acid having from 2 through 30 carbon atoms and at least one

group (preferably, also, at least one primary, secondary or tertiary alcoholic hydroxyl group); and/or (B) one or more metal salts of non-nitrogenous alcohols (primary, secondary or tertiary alcohols) having from 2 through 30 carbon atoms, as disclosed in the aforementioned United States Patent 3,484,399. The metal salts of (B) are often designated as alcoholates. The metal salts of both (A) and (B) are characterized as being formic acid acceptors.

The metal salts used in practicing this invention are either commercially available or can be produced in known manner. Advantageously the cation of such salts is an alkali metal (sodium, potassium, lithium, rubidium or cesium) or an alkaline-earth metal. The term "alkaline-earth metal," as used in this specification and in the appended claims, includes within its meaning not only calcium, strontium and barium but also magnesium, which latter element is sometimes excluded, in chemical textbooks and publications, from the alkaline-earth family of metals. Other salts that may be used (especially in combination with alkali-metal or alkaline-earth-metal salts) are those wherein the cation is, for example, beryllium, zinc, aluminum, titanium, germanium, zirconium or tin. The available evidence indicates that optimum thermal stabilization of the oxymethylene polymer is obtained when the cation is one which forms a relatively strong base as do the alkali metals and the alkaline-earth metals.

The metal salt component of the stabilized polymer composition may be one or more metal salts of the aforementioned non-nitrogenous organic acids and/or one or more metal salts of the aforesaid non-nitrogenous alcohols. The organic acid may be monobasic or polybasic, saturated or unsaturated, branched-chain or straight-chain, and substituted or unsubstituted provided that any substituent or substituents are inert during formulation; that is, are free from any interfering functional gorup or groups that would cause or result in the occurrence of undesirable side reactions. For example, —OH groups are permissible substituents; and, in fact, the available evidence indicates that they are desirable. Or, the substituent may be, for instance an —OR group where R represents an alkyl radical such as a lower alkyl radical, specifically a $C_1$ through $C_5$ alkyl radical.

Illustrative examples of non-nitrogenous organic acids that may be employed in producing the aforementioned metal salts are the unsubstituted, straight-chain, saturated, aliphatic, monocarboxylic acids having from 2 through 30 carbon atoms, viz., ethanoic, propanoic, butanoic and higher members of the homologous series through triacontanoic (melissic), $C_{29}H_{59}COOH$; the corresponding branched-chain, saturated, aliphatic, monocarboxylic acids, e.g., alphamethylbutyric (2-methylbutanoic), isovaloric (3-methylbutanoic), pivalic (2,2-dimethylpropanoic) and 2-ethylhexoic (octoic); the monoethylenically unsaturated, aliphatic, monocarboxylic acids having up to and including about 30 carbon atoms, e.g., 4 - decenoic, caproleic, 10 - undecenoic, lauroleic, 5 - tetradecenoic, myristoleic, palmitoleic, cis-6 - octadecenoic, trans - 6 - octadecenoic, oleic, elaidic, trans - 11 - octadecenoic, cis 9-eicosenoic, 11-docosenoic, erucic, brassidic, cis-15 - tetracosenoic, and 17 - hexacosenoic.

Still other examples of useful non-nitrogenous organic acids that may be employed in making the metal salts are the di-, tri- and higher polyethylenically unsaturated aliphatic, monocarboxylic acids having up to and including about 30 carbon atoms, e.g., sorbic, linoleic, linolelaidic, hiragonic, a-eleostearic, -eleostearic, punicic, linolenic, elaidolinolenic, pseudoeleostearic, moroctic, a-parinaric, -parinaric, arachidonic, clupanodonic and nisinic.

As indicated hereinbefore, the metal salts of hydroxy-substituted carboxylic acids having up to and including 30 carbon atoms have been found to be particularly suitable for use in practicing this invention and are not the full equivalent of the other metal salts. The metal ricinoleates, more particularly the ricinoleates of the alkaline-earth metals, and specificaly calcium ricinoleate, are outstanding in their utility as a modifier of an oxymethylene polymer.

Ricinoleic acid,

is therefore the preferred hydroxy-substituted carboxylic acid, the metal salt of which is especially valuable in carrying the instant invention into effect. Additional specific examples of other acids of this same sub-group that similarly may be employed are alpha-hydroxydecanoic, 3-hydroxydecanoic acid having the formula

12-hydroxydodecanoic (sabinic), 16 - hydroxyhexadecanoic (juniperic), 10-hydroxyhexadecanoic, 12-hydroxyoctadecanoic, 10-hydroxy-8-octadecenoic, DL-erythro-9, 10-dihydroxyoctadecanoic and lanoceric acids.

Illustrative examples of other substituted non-nitrogenous organic acids, the metal salts of which may be employed in practicing this invention, are the various keto-substituted aliphatic monocarboxylic acids, e.g., pyruvic, acetoacetic, 4-oxooctadecanoic, 6-oxooctadecanoic, 10-oxooctadecanoic, 17-oxooctadecanoic, 13-oxodotriacontanoic, 13-oxohexatetracontanoic, alpha-licanoic, 6,7-dioxooctadecanoic and 9,10-dioxooctadecanoic acids.

Examples of still other monocarboxylic acids that may be used in making the metal salts are the various aromatic monocarboxylic acids, e.g., benzoic acid, ortho-, meta- and para-toluic acids, the various hydroxy-substituted toluic acids including the 2- and 3-para-toluic acids, etc.; the aryl-substituted aliphatic monocarboxylic acids, e.g., phenyl-acetic (alpha-toluic) acid, etc.; dihydroxy monocarboxylic acids, e.g., glyceric acid; and others up to 30 carbon atoms (preferably up to not more than about 20 carbon atoms), that will be apparent to those skilled in the art from the foregoing illustrative examples.

Instead of using metal salts of monobasic acids, one may employ metal salts of di-, tri- and higher polybasic acids. Examples of such acids are the saturated dicarboxylic acids having from 2 through 30 carbon atoms, including oxalic, malonic, succinic, glutaric, adipic, pimelic, suberic, sebacic, azelaic and higher members of the homologous series up to and including about 30 carbon atoms; tricarballylic and other higher polycarboxylic acids; ethylenically unsaturated poly-basic acids, e.g., fumaric, maleic, itaconic, citraconic, mesaconic and aconitic acids; aromatic polycarboxylic acids, e.g., phthalic, terephthalic, isophthalic and chlorophthalic acids; and the various hydroxy-substituted polycarboxylic acids, e.g., citric, tartronic, malic, tartaric, dihydroxysuccinic, saccharic, mucic, etc.; as well as other acids having from 2 up to about 30 carbon atoms that will be apparent to the skilled chemist from these illustrative examples.

Illustrative examples of non-nitrogenous alcohols of which the metal salts or alcoholates can be made and used in practicing this invention are those alcohols which are free from a carboxyl

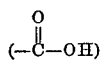

group or groups, but otherwise correspond to the carboxylic acids hereinbefore given by way of illustration. Among such alcohols may be mentioned the straight-chain and branched-chain, saturated, monohydric alcohols, such as ethanol and the normal and isomeric forms of propanol through triacontanol; and the mono-, di- and higher polyethylenically unsaturated monohydric alcohols corresponding to the aforementioned saturated monohydric alcohols including, for example, allyl, methallyl, crotyl, cinnamyl, alpha-phenylallyl, 3-buten-2-ol, 1-penten-3-ol, 3-penten-2-ol, 4-penten-1-ol, 4-penten-2-ol, 3-ethyl-5-hexen-3-ol and higher members of the homologous series.

Still other examples include the non-nitrogenous alcohol-ethers, e.g., the monoethyl, -butyl, -phenyl, and -benzyl ethers of ethylene glycol and of diethylene glycol, propylene glycol monomethyl ether, pentylene glycol monethyl ether, decylene glycol monophenyl ether and dibutylene glycol monobutyl ether.

Other specific examples include the various non-nitrogenous polyhydric alcohols containing up to about 30 carbon atoms, e.g., ethylene glycol, diethylene glycol, triethylene glycol, tetraethylene glycol, hexamethylene glycol, decamethylene glycol, 2-ethyl-1,3-hexanediol, 1,3-butylene glycol, pentaethylene glycol, heptaethylene glycol, octaethylene glycol, decaethylene glycol, 2-butyl-1,3-octanediol, 3-ethyl-2-methylol-1-hexanol, 6-methyl-2, 4-heptanediol, glycerol, orythritol, pentaerythritol, dipentaerythritol, adonitol, xylitol, arabitol, mannitol, dulcitol, sorbitol, trimethylolpropane, cocceryl alcohol, and others that will be apparent to those skilled in the art from the foregoing illustrative examples.

The use of metal salts of non-nitrogenous ethynoid (acetylenically unsaturated) aliphatic carboxylic acids and metal salts of ethynoid alcohols, which salts are available or can be prepared, is not precluded in producing the stabilized oxymethylene polymer compositions of this invention. Also within the scope of this invention is the use of the alkali-metal, alkaline earth-metal and other metal salts of alicyclic (e.g., naphthenic) compounds containing at least one carboxyic acid group and/or at least one alcohol hydroxyl group.

It is preferred that the stabilizing additive employed in practicing this invention be a normal or full metal salt of the defined non-nitrogenous organic acid or alcohol. However, the use of partial salts also is contemplated, this is metal salts of the defined acids and alcohols wherein only part (e.g., ½, ⅓, ⅔, ¼, ¾, etc.) of the total carboxylic and/or alcoholic groups of the acid, alcohol or acid-alcohol have been reacted to form a salt thereof. When such partial salts are used, then ordinarily a larger amount of stabilizing additive is required in order to attain the same degree of thermal stabilization.

Component (C) of the stabilizer system is a modified fatty acid polyamide. Such modified fatty acid polyamides, and a process for their production, are disclosed in U.S. Patent 3,383,391 issued to Daniel J. Carlick et al., assignors to Sun Chemical Corporation, on May 14, 1968.

In general these polyamides are prepared by reacting a mixture of polycarboxylic acids having more than one functional acid group with a polyamine in the presence of an aromatic polycarboxylic acid or anhydride thereof. The polycarboxylic acids should be reacted with the polyamine in sufficient amounts to provide a ratio of carboxyl to amino groups in the range of from about 0.6 to about 0.9. The aromatic polycarboxylic acid or anhydrides thereof should be present in sufficient amounts to provide a ratio of carboxyl groups from the aromatic polycarboxylic acid to amino groups of from about 0.05 to about 0.3, preferably about 0.1, to substantially neutralize the excess amino groups present. However, the ratio of the total carboxyl groups from both the aromatic and polycarboxylic acids to the amino groups from the polyamine should be from about 0.6 to about 0.9. The novel polyamides thus prepared have from about 1.8 to about 2.0 functional carboxyl and amine groups per mole.

Any high molecular weight fatty acid of 8 or more carbon atoms such as linoleic, linolenic, stearic, octadecadienoic acids, and the $C_{20}$, $C_{22}$, $C_{24}$ and $C_{26}$ fatty acids may be employed. Also fatty acid derivatives such as esters acid anhydrides and acylhalides of such fatty acids may be employed.

Suitable polycarboxylic acids also include the dimers and trimers of olefinically unsaturated monocarboxylic acids having from 10 to 20 carbon atoms, preferably 15 to 18 carbon atoms to the molecule, which acids may be the same or different in the dimer or trimer molecule, for example undecylenic acid, oleic, linoleic, and linolenic acids.

The polyamines which may be employed for the reaction with the polycarboxylic acids are those having the formula:

where R is an alkylene radical having from 1 to 8 carbon atoms, and X is an integer from 1 to 6. Preferably, the polyamines contemplated for usage herein are those of relatively short chain length, as for example, a chain length of from about 1 to 8 carbon atoms, preferably having from about 2 to 6 carbon atoms per molecule. Examples of such polyamines are ethylene diamine, trimethylene diamine, tetramethylene diamine, pentamethylene diamine, hexamethylene diamine, and diethylene triamine, triethylene tetramine, tetramethylene pentamine, 1,4-diaminobutane, 1,3-diaminobutane, 3-(N-isopropylamino) propylamine, 3,3'-iminobispropylamine, and the like.

The aromatic polycarboxylic acids, or anhydrides thereof, are used as chain terminating agents. As such the aromatic polycarboxylic acids, or anhydrides thereof, react with the free amine groups to form imide groups which render the amine groups unavailable for further reaction with other polycarboxylic acid groups. A variety of aromatic carboxylic acids may be employed as chain terminating agents, particularly hydrogenated aromatic polycarboxylic acids having from about 8 carbon atoms to the molecule. For example, suitable aromatic polycarboxylic acids which can be employed are phthalic acid, tetrahydrophthalic acid, hexahydrophthalic acid, "nadic" acid, and anhydrides thereof.

In the preparation of these polyamides, the resin composition should have free acid groups and the relative number of these may be referred to as the acid number or acid value. Thus, the polyamides must have an acid value of at least 1 and preferably should have an acid value of from 5 to 8. The ratio of total acid value to total amine value of the polyamides must be in the range of 0.6 to 0.9, and more preferably in the range of 0.70 to 0.85. The polyamide composition thus described will have an average per mole functionality of between 1.8 to 2.0. By the term functionality we mean the number of reactive carboxyl groups and amine groups per mole of polyamide product. The components of the stabilizer system are incorporated into the oxymethylene polymer in the following amounts. All percentages given below are weight percent, based upon the weight of the polymer.

The alkylene bisphenol is admixed in amounts not exceeding 5 weight percent and preferably from about 0.01 to about 1 weight percent, most preferably from 0.3 to about 1 weight percent, based upon the weight of the oxymethylene polymer. The metal salt component should be present at up to about 5 percent by weight of the oxymethylene polymer, e.g., from 0.001 to 5 percent, and still more particularly 0.01 to 3 percent by weight of the polymer. The preferred amount of the metal component is a stabilizing amount (e.g., 0.01–0.05% up to 1.5 percent by weight of the oxymethylene polymer.

The modified fatty acid polyamide should be present at from about 0.2 to about 0.5 weight percent and preferably from 0.3 to 0.5 weight percent based upon the weight of the oxymethylene polymer.

The thermal degradation rate of the polymer ($K_{D230}$) is measured by determining the percent weight loss of a sample of the polymer heated in an open vessel in a circulating air oven at 230° C. For example, the $K_{D230}$ of an unstabilized pigmented or non-pigmented oxymethylene copolymer of trioxane and ethylene oxide, which was subjected to hydrolysis to remove unstable end groups, is well over 1 percent per minute and generally results in a complete loss after 45 minutes at 230° C.

When the antioxidant and the metal salt component are admixed into the unpigmented polymer, $K_{D230}$ values of below 0.013 weight percent loss per minute, can be readily obtained when the metal salt component is calcium ricinoleate.

When pigment is incorporated into the oxymethylene polymer, antioxidant and metal salt component stabilizer system, the $K_{D230}$ value increases to from about 0.027 to about 0.031 weight percent loss per minute when the pigment concentration is 0.5 weight percent based upon the weight of this oxymethylene polymer.

When pigment is incorporated into the oxymethylene polymer stabilized with only modified fatty acid polyamide the $K_{D230}$ value is from about 0.31 to about 0.35 weight percent loss per minute.

When pigment is incorporated into the oxymethylene polymer, antioxidant, metal salt component and modified fatty acid polyamide stabilized system, the $K_{D230}$ value is decreased to from about 0.012 to about 0.014 weight percent loss per minute.

The stabilized pigmented oxymethylene polymer compositions of our invention can be prepared by admixing the components of our stabilizer system with the unstabilized pigmented polymer in any suitable manner, whereby a substantially homogenous composition is obtained. For example the stabilizer components may be admixed intimately with the pigmented oxymethylene polymer by being applied in solution in a suitable solvent to the finely divided solid pigmented oxymethylene polymer followed by evaporation of the solvent.

The admixture may also be made by dry blending the finely divided pigmented oxymethylene polymer and finely divided stabilizers followed by extrusion or melt compounding or by milling the stabilizers into the pigmented polymer as the latter is worked on a rubber mill.

The stabilized pigmented oxymethylene polymer compositions also include if desired, plasticizers, lubricants and other stabilizers, e.g. stabilizers against degradation by ultraviolet light, e.g., 2,2'-dihydroxy-4,4'-dimethoxybenzophenone; 2-hydroxy-4-methoxy-benzophenone; 2-hydroxy-4-methoxy-4'-chloro-benzophenone, and the like, which can be incorporated in amounts of about 1% by weight based upon the weight of the oxymethylene polymer.

In order that those skilled in the art may better understand how the present invention can be carried into effect, the following examples are given by way of illustration and not by way of limitation. All parts are weights and percentages are by weight based on the weight of the polymer unless otherwise stated.

Unless otherwise stated, the oxymethylene polymers used in the following examples is an oxymethylene copolymer of trioxane and ethylene oxide which was prepared as described in Example I of U.S. Patent 3,254,053 issued to G. Fisher, F. Brown and W. Heinz on May 31, 1966.

Catalyst residues in the polymer were deactivated with an amine as described in U.S. Pat. 2,989,509 issued to D. Hudgin and F. Berardinelli on June 20, 1961.

The polymer is then subjected to hydrolysis to remove unstable terminal units as described in U.S. Patent 3,318,848 issued to C. Clark on May 9, 1967.

EXAMPLE I

The thermal degradation rate of pigmented and non-pigmented trioxane-ethylene oxide hydroxylated copolymer containing 2.4 percent by weight ethoxy units, was measured by placing samples of the pigmented and non-pigmented oxymethylene polymer in a circulating air oven at 230° C. The pigmented samples were prepared with the concentration of pigment material at about 0.5 weight percent based upon the oxymethylene polymer. Mercadium red, phthalo blue, chromium oxide green, titanium dioxide white, and carbon black pigments, and combinations thereof were tested. There was a complete loss of polymer product after 45 minutes, indicating the instability of the unstabilized pigmented or nonpigmented polymer.

EXAMPLE II

To 100 parts of a trioxane-ethylene oxide hydroxylated copolymer containing 2.4 percent by weight ethoxy units was added;
(a) 0.5 part of bis (2-hydroxy-3-t-butyl-5-methyl-phenyl) methane as antioxidant; and
(b) 0.1 part of calcium ricinoleate.

The components were mixed in a Henscheld mixer under high shear and high r.p.m. for 3 minutes and then extruded in a Brabender Plastigraph Extruder with an L/D of 25/1 at a melt temperature of 430° F.

The $K_{D230}$ value of this composition was determined by the procedure of Example I and was 0.009 percent per minute weight loss.

EXAMPLES III–IV

To 100 parts of a trioxane-ethylene oxide hydroxylated copolymer containing 2.4 percent by weight ethoxy units was added;
(a) 0.5 part of bis (2-hydroxy-3-t-butyl-5-methyl-phenyl) methane;
(b) 0.1 part of calcium ricinoleate; and
(c) 0.5 part of various pigments.

The components were mixed and the mixture extruded as in Example II.

The $K_{D230}$ values were determined by the procedure of Example I and the results obtained are set forth in Table I.

Red, white, blue, green and carbon black pigments, and thereof, as shown in Example I, were tested with substantially similar results.

What Table I shows is the marked increase in thermal decomposition rate of the oxymethylene polymer stabilized system of Example II when pigment material is incorporated in the composition.

TABLE I

| Example | Polymer, parts | Pigment, parts | Calcium ricinoleate, parts | Antioxidant, parts | $K_{D230}$ |
|---|---|---|---|---|---|
| III | 100 | 0.5 carbon black | 0.1 | 0.5 | 0.031 |
| IV | 100 | 0.5 Red 3198 | 0.1 | 0.5 | 0.027 |

NOTE.—The antioxidant used was bis (2-hydroxy-3-t-butyl-5-methyl-phenyl) methane. Red 3198 is the color number. After mixing the concentrate with the natural resin, the mix contains 0.4% cadmium lithonone red and 0.2% dye toner.

EXAMPLES V–VI

To 100 parts of a trioxane-ethylene oxide hydroxylated copolymer containing 2.4 percent by weight ethoxy units was added;

(a) 0.5 parts carbon black pigment; and (b) Various amounts of Sunkem 526G—a modified fatty acid polyamide comprising the reaction product of a mixture of polycarboxylic acids having a major proportion of dimeric linoleic acids, ethylene diamine, and hydrogenated phthalic acid, sold by the Sun Chemical Corporation. The amounts used and the results obtained are set forth in Table II.

The components were mixed and the mixture extruded as in Example II.

The $K_{D230}$ values were determined by the procedure of Example I.

Red, white, blue, green and carbon black pigments, and combinations thereof, as shown in Example I were tested with substantially similar results.

What Table II shows is that the modified fatty acid polyamide by itself will not stabilize the thermal decomposition rate of the pigmented oxymethylene polymer.

TABLE II

| Example | Polymer, parts | Carbon black, parts | Modified fatty acid polyamide, parts | $K_{D230}$ |
|---|---|---|---|---|
| V | 100 | 0.5 | 0.3 | 0.35 |
| VI | 100 | 0.5 | 0.5 | 0.31 |

EXAMPLES VII–XXVIII

To 100 parts of a trioxane-ethylene oxide hydroxylated copolymer containing 2.4 percent by weight ethoxy units was added;

(a) 0.5 part bis (2-hydroxy-3-t-butyl-5-methyl-phenyl) methane;

(b) 0.1 part calcium ricinoleate (c) 0.5 part of various pigment materials; and (b) Various amounts of Sunkem 526G—a modified fatty acid polyamide comprising the reaction product of a mixture of polycarboxylic acids having a major proportion of dimeric linoleic acids, ethylene diamine, and hydrogenated phthalic acid, sold by the Sun Chemical Corporation. The amounts used and the results obtained are set forth in Table III.

The components were mixed and the mixture extruded as in Example II.

The $K_{D230}$ values were determined by the procedure of Example I.

Red, white, blue, green and carbon black pigments and combinations thereof, as shown in Example I, were tested with substantially similar results.

What Table III shows is that stabilizer system of the present invention effectively reduces the thermal decomposition rate of a pigmented oxymethylene polymer.

TABLE III

| Example | Polymer, parts | Antioxidant, parts | Calcium ricinoleate, parts | Pigment, parts | Modified fatty acid polyamide, parts | $K_{D230}$ |
|---|---|---|---|---|---|---|
| VII | 100 | 0.5 | 0.1 | 0.5 carbon black | 0 | 0.031 |
| VIII | 100 | 0.5 | 0.1 | do | 0.2 | 0.016 |
| IX | 100 | 0.5 | 0.1 | do | 0.3 | 0.012 |
| X | 100 | 0.5 | 0.1 | do | 0.4 | 0.014 |
| XI | 100 | 0.5 | 0.1 | do | 0.5 | 0.013 |
| XII | 100 | 0.5 | 0.1 | 0.5 Red 3198 | 0 | 0.027 |
| XIII | 100 | 0.5 | 0.1 | do | 0.2 | 0.023 |
| XIV | 100 | 0.5 | 0.1 | do | 0.3 | 0.014 |
| XV | 100 | 0.5 | 0.1 | do | 0.4 | 0.013 |
| XVI | 100 | 0.5 | 0.1 | do | 0.5 | 0.013 |
| XVII | 100 | 0.5 | 0.1 | 0.5 White 3946 | 0 | 0.017 |
| XVIII | 100 | 0.5 | 0.1 | do | 0.2 | 0.010 |
| XIX | 100 | 0.5 | 0.1 | do | 0.3 | 0.009 |
| XX | 100 | 0.5 | 0.1 | do | 0.5 | 0.007 |
| XXI | 100 | 0.5 | 0.1 | 0.5 Red 3067 | 0 | 0.025 |
| XXII | 100 | 0.5 | 0.1 | do | 0.2 | 0.014 |
| XXIII | 100 | 0.5 | 0.1 | do | 0.3 | 0.012 |
| XXIV | 100 | 0.5 | 0.1 | do | 0.5 | 0.010 |
| XXV | 100 | 0.5 | 0.1 | 0.5 Blue 3859 | 0 | 0.019 |
| XXVI | 100 | 0.5 | 0.1 | do | 0.2 | 0.012 |
| XXVII | 100 | 0.5 | 0.1 | do | 0.3 | 0.010 |
| XXVIII | 100 | 0.5 | 0.1 | do | 0.5 | 0.009 |

NOTE.—The antioxidant used was bis (2-hydroxy-3-t-butyl-5-methyl-phenyl) methane. Red 3198 is the color number. After mixing the concentrate with the natural resin, the mix contains 0.4% cadmium lithopane red and 0.2% dye toner. White 3946 is the color number. After mixing the concentrate with the natural resin, the mix contains 1% titanium dioxide and 0.002% cadmium yellow. Red 3067 is the color number. After mixing the concentrate with the natural resin, the mix contains 0.3% cadmium red and 0.4% mercadmium red. Blue 3859 is the color number. After mixing the concentrate with the natural resin, the mix contains 0.1% monastrial blue, 0.1% titanium dioxide and 0.05% carbon black.

EXAMPLES XXIX–XXX

To 100 parts of a trioxane-ethylene oxide hydroxylated copolymer containing 2.4 percent by weight ethoxy units was added;

(a) 0.5 part carbon black pigment;

(b) 0.5 part bis (2-hydroxy-3-t-butyl-5-methyl-phenyl) methane as antioxidant; and (c) Various amounts of Sunkem 526G—a modified fatty acid polyamide comprising the reaction product of a mixture of polycarboxylic acids having a major proportion of dimeric linoleic acids, ethylene diamine, and hydrogenated phthalic acid, sold by the Sun Chemical Corporation. The amounts used and the results obtained are set forth in Table IV.

The components were mixed and the mixture extruded as in Example II.

The $K_{D230}$ values were determined by the procedure of Example I.

What Table IV shows is that the thermal stability of the pigmented oxymethylene polymer composition cannot be significantly improved by the incorporation therein of excess polyamide alone and that the ternary stabilizer system of the instant invention is required to synergistically improve the thermal stability of the pigmented oxymethylene polymer composition as shown in Table III.

TABLE IV

| Example | Polymer, parts | Antioxidant, parts | Calcium ricinoleate, parts | Pigment, parts | Modified fatty acid polyamide, parts | $K_{D220}$ |
|---|---|---|---|---|---|---|
| XXIX | 100 | 0.5 | 0 | 0.5 carbon black | 0.3 | 0.20 |
| XXX | 100 | 0.5 | 0 | ____do____ | 0.5 | 0.17 |

NOTE.—The antioxidant was bis (2-hydroxy-3-t-butyl-5-methyl-phenyl) methane.

It is to be understood that the foregoing detailed description is given merely by way of illustration and that many other variations may be made without departing from the spirit of our invention as defined in the following claims.

What is claimed is:

1. A stabilized pigmented oxymethylene polymer composition which comprises a pigmented oxymethylene polymer having incorporated therein:

(a) an alkylene bisphenol stabilizer present in amounts of from about 0.05 to about 5.0 weight percent, based upon said oxymethylene polymer;

(b) a small, positive, stabilizing amount up to about 5 percent by weight of a stabilizing additive selected from the group consisting of metal salts of non-nitrogenous organic acids having from 2 to 30 carbon atoms and at least one carboxy group and metal salts of non-nitrogenous alcohols having from 2 to 30 carbon atoms, wherein the metal is selected from the group consisting of alkali metals, alkaline-earth metals, zinc, aluminum, and tin and said metal salts of non-nitrogenous organic acids and alcohols are formic acid acceptors; and (c) a polyamide composition having a functionality of from about 1.8 to 2.0 comprising the reaction product of a mixture of polycarboxylic acids having a major proportion of dimeric linoleic acids, an ethylene diamine, said mixture of dimeric acids and ethylene diamine, being present in sufficient amounts to provide a ratio of carboxyl groups to amine groups of from 0.6 to 0.9; and a chain-terminating agent selected from the group consisting of hydrogenated phthalic acid, and hydrogenated phthalic anhydride, said agent being present in an amount to provide a ratio of carboxyl groups to amine groups of from 0.05 to 0.3, said polyamide being present in amounts of from about 0.3 to about 0.5 weight percent based upon said oxymethylene polymer.

2. The composition of claim 1 wherein said oxymethylene polymer is a copolymer containing at least 60 percent recurring oxymethylene units.

3. The composition of claim 2 wherein said phenolic stabilizer is bis(2-hydroxy-3-t-butyl-5-methyl-phenyl) methane.

4. The composition of claim 3 wherein said metal salt stabilizing additive is a salt of barium.

5. The composition of claim 3 wherein said metal salt stabilizing additive is a salt of calcium.

6. The composition of claim 3 wherein said metal salt stabilizing additive is a ricinoleate of an alkaline earth metal.

7. The composition of claim 3 wherein said metal salt stabilizing additive is calcium ricinoleate.

8. The composition of claim 7 wherein said chain terminating agent is tetrahydrophthalic anhydride.

9. The composition of claim 7 wherein said chain terminating agent is hexahydrophthalic anhydride.

10. The composition of claim 7 wherein said chain terminating agent is tetrahydrophthalic acid.

11. The composition of claim 7 wherein said chain terminating agent is hexahydrophthalic acid.

12. The composition of claim 7 wherein said pigment material is carbon black.

References Cited

UNITED STATES PATENTS

| | | | |
|---|---|---|---|
| 3,377,313 | 4/1968 | Jupa et al. | 260—41 |
| 3,484,399 | 12/1969 | Kakos | 260—18 |
| 3,383,391 | 5/1968 | Carlick et al. | 260—18 |
| 3,306,953 | 2/1967 | Fourcade et al. | 260—857 |
| 3,597,387 | 8/1971 | Starr et al. | 260—37 |

DONALD E. CZAJA, Primary Examiner

E. C. RZUCIDLO, Assistant Examiner

U.S. Cl. X.R.

260—37 AL, 45.9 P, 45.95, 857 R